(12) United States Patent
Plangetis

(10) Patent No.: US 7,111,523 B1
(45) Date of Patent: Sep. 26, 2006

(54) ROTATIONAL POWER TRANSMITTING DRIVE COMPONENT WITH IMPROVED ACOUSTIC AND ASSEMBLY CHARACTERISTICS

(75) Inventor: Gus F. Plangetis, Annapolis, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 521 days.

(21) Appl. No.: 10/641,586

(22) Filed: Aug. 15, 2003

(51) Int. Cl.
*F16H 55/17* (2006.01)

(52) U.S. Cl. .................. 74/460; 464/182; 403/368
(58) Field of Classification Search .................. 74/460; 464/182; 403/368, 370, 359.1, 359.6
See application file for complete search history.

(56) References Cited

U.S. PATENT DOCUMENTS 4,304,502 A * 12/1981 Stratienko .................. 403/370
4,338,036 A * 7/1982 DeLeu ........................ 403/16
4,396,310 A * 8/1983 Mullenberg .................. 403/16
4,615,640 A * 10/1986 Hosokawa .................. 403/369
5,775,831 A * 7/1998 Mullenberg ................ 403/337
6,247,382 B1 * 6/2001 Umeki et al. ............ 74/572.12
6,578,441 B1   6/2003 Jurenka et al.
6,663,313 B1 * 12/2003 Lewis et al. ............. 403/374.3

* cited by examiner

*Primary Examiner*—David M. Fenstermacher
(74) *Attorney, Agent, or Firm*—Jacob Shuster

(57) ABSTRACT

A structural power transmitting component embodies a shaft and a gear or pulley held threadedly positioned on the shaft by four nuts while interconnected by a torque transmitting wedge and key. The shaft is especially configured to establish structural interrelationships with the nuts, wedge, key and gear so as to facilitate assembly and disassembly of the component as well as to maintain the wedge and key deformed under engagement by the nuts to avoid development of internal clearances during start-up and stoppage of torque transmission to thereby preclude generation of noise during such operational start-up and stoppage of transmission through the component.

5 Claims, 3 Drawing Sheets

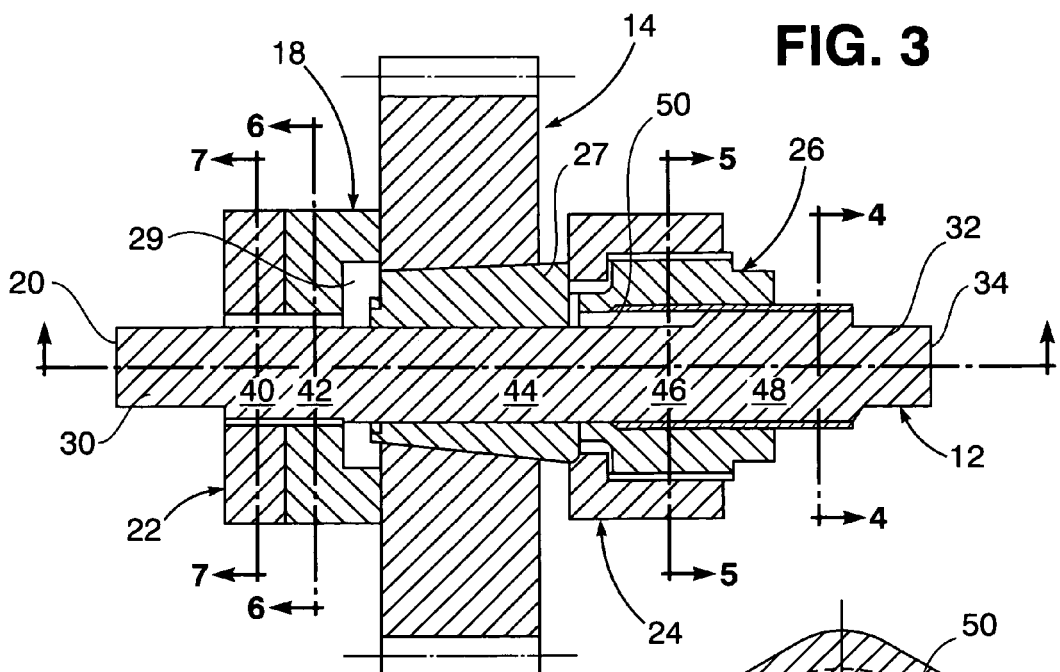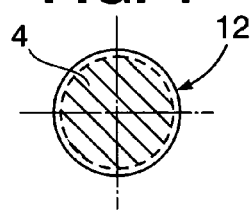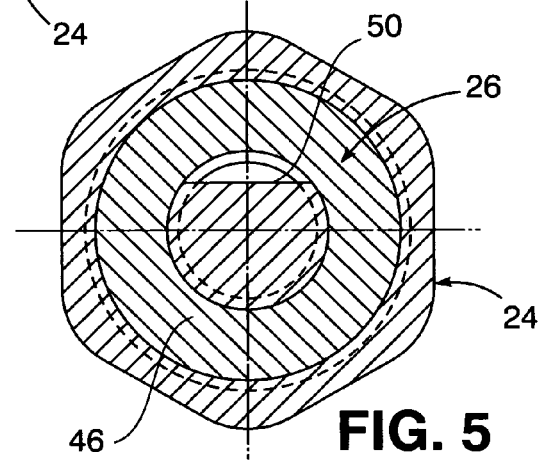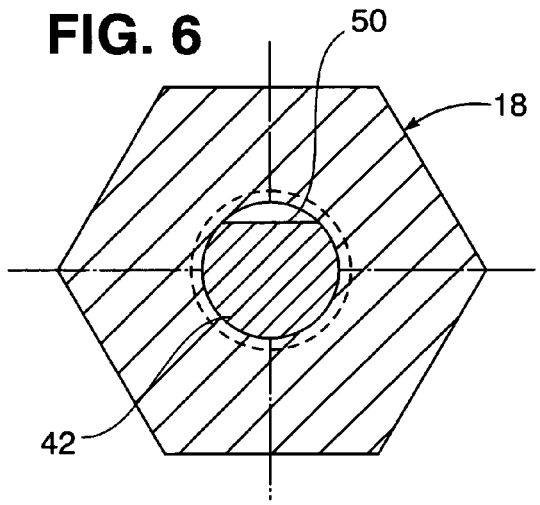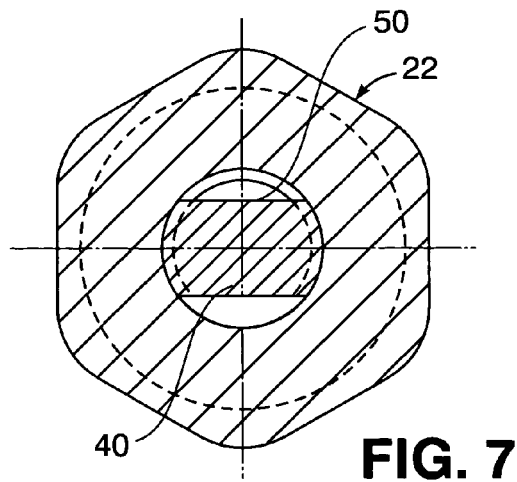

US 7,111,523 B1

ROTATIONAL POWER TRANSMITTING DRIVE COMPONENT WITH IMPROVED ACOUSTIC AND ASSEMBLY CHARACTERISTICS

The present invention relates to the construction and installation of parts forming a torque transmitting component.

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION

Power transmitting systems currently utilized in certain installations such as submarines are a source of transient noise during short operational starting and finishing periods. Such systems involve a power shaft to which a pulley or gear is connected by well known facilities involving for example a key, spline or force fit. However, such connection facilities have certain handicaps involving development of looseness between the parts producing impact and acoustic noise problems. It is therefore an important object of the present invention to provide a more quiet and dependable drive arrangement involving the shaft and rotational pulley or gear so as to avoid such acoustic problems.

SUMMARY OF THE INVENTION

In accordance with the present invention, a rotational member such as a pulley or gear is wedgedly positioned at a desired location over a flat surface of an intermediate portion of a power shaft between cross-sectionally circular end sections thereof, by means of a tapered key extending through a slot in the gear in contact with the flat shaft surface. The gear is positioned and held assembled in the desired location by locator and lock nuts threadedly mounted on the shaft in contact with one axial side of the gear, while inner and outer nuts are threaded onto the shaft in axial engagement with the key and the wedge on the other side of the gear, so as to facilitate installation and hold the installed gear in position without development of any clearance during operation of an associated powered system so as to avoid operationally induced acoustic noise problems.

BRIEF DESCRIPTION OF DRAWING

A more complete appreciation of the invention and many of its attendant advantages will be readily appreciated as the same becomes better understood by reference to the following detailed description when considered in connection with the accompanying drawing wherein:

FIG. 3 is a side section view taken substantially through a plane indicated by section line 3—3 in FIG. 1;

FIGS. 4, 5, 6 and 7 are transverse section views taken substantially through planes indicated by section lines 4—4, 5—5, 6—6 and 7—7 in FIG. 3.

DETAILED DESCRIPTION OF PREFERRED EMBODIMENT

Figure 1:
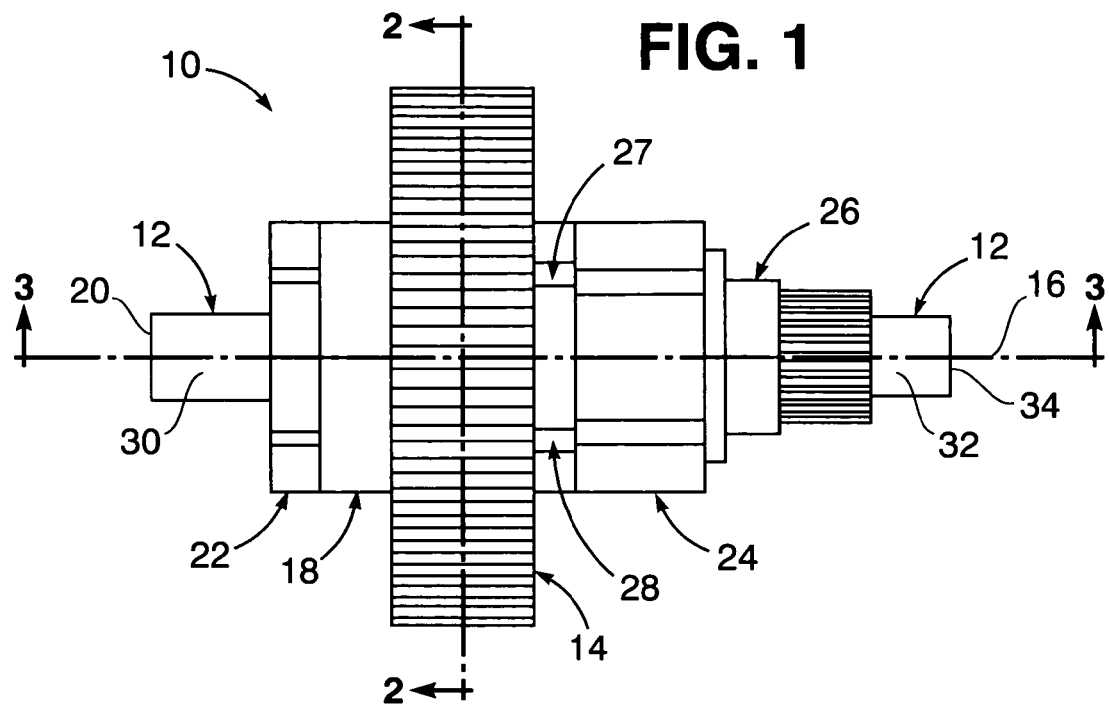
FIG. 1 is a side elevation view of an assembled drive component constructed in accordance with one embodiment of the present invention.

Referring now to the drawing in detail, FIG. 1 illustrates an assembled drive component 10 having an axially elongated drive shaft 12 on which a torque transmitting member such as a pulley or a peripherally toothed gear 14 is mounted for rotation with the shaft 12 about an axis 16. The gear 14 is in abutment on one axial side thereof with a locator nut 18 for its positioning on the shaft 12 in spaced relation to one axial shaft end 20. The gear 14 is locked in such position on the shaft 12, as hereinafter explained, by an end lock nut 22 and an outer lock holding nut 24 which is axially spaced from the gear 14 on that side thereof opposite the gear positioning nuts 18 and 22. Also positioned on the shaft 12 as shown in FIG. 1 is an inner holding nut 26 axially extending into the outer lock holding nut 24.

Figure 2:
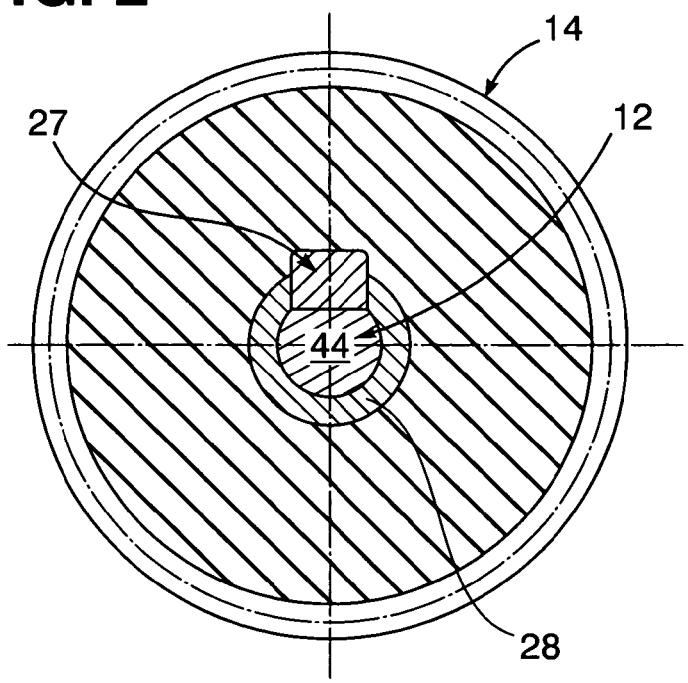
FIG. 2 is a transverse section view taken substantially through a plane indicated by section line 2—2 in FIG. 1.
Figure 8:
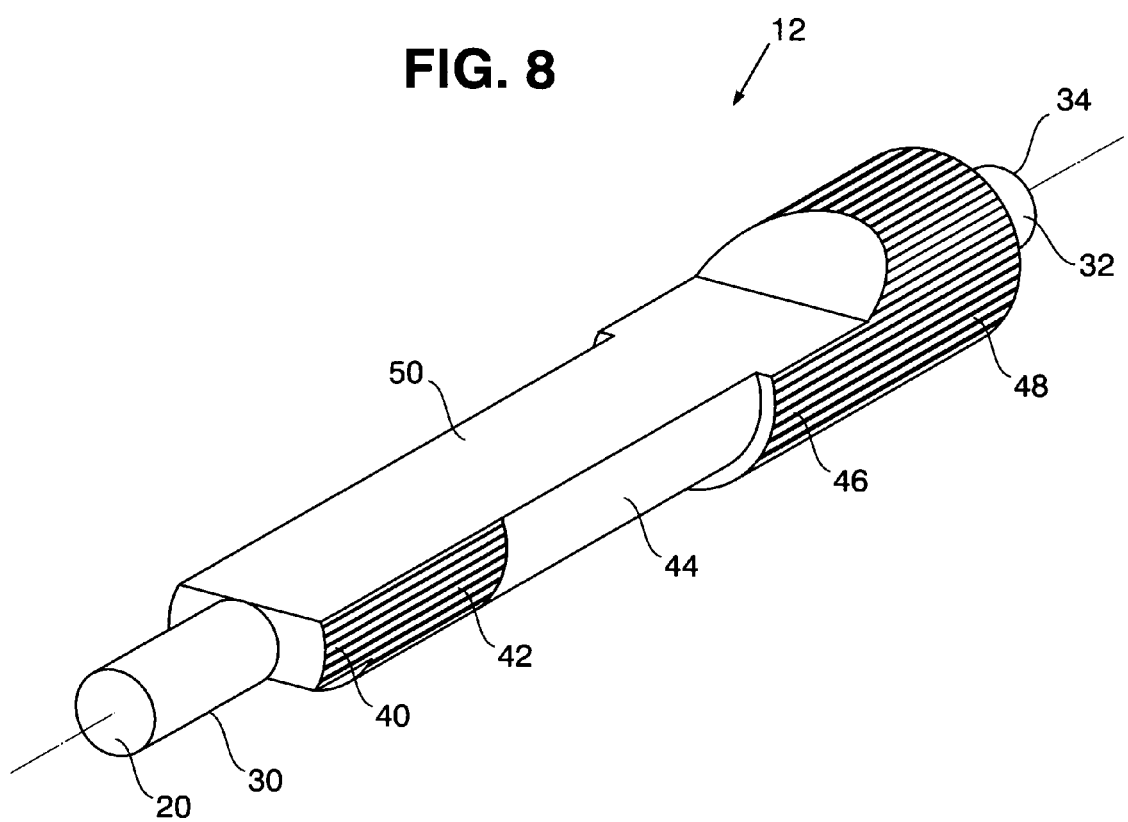
FIG. 8 is a perspective view of the disassembled shaft associated with the component illustrated in FIGS. 1–7.

The assembled component 10 also features a tapered key 27 positioned within a slot formed in the gear 14 and through a tapered wedge 28 through which the shaft 12 extends within the gear 14 as shown in FIGS. 2 and 3. The key 27 and the wedge 28 are respectively in axial abutment with the outer lock nut 24 and the inner holding nut 26 in the fully assembled condition of the component as shown in FIG. 3. Such key 27 and the wedge 28 then also project axially from the gear 14 into a recess 29 formed in the locator nut 18.

As shown in FIGS. 3–8, the shaft 12 is configured so as to accommodate reception and installation thereon of the gear 12, the four nuts 18, 22, 24 and 26, the wedge 28 and the key 27. Toward that end, the shaft 12 cross-sectionally deviates from axially aligned cross-sectionally circular end sections 30 and 32 of smaller diameter at the opposite axial shaft ends 20 and 34. A radially larger intermediate portion of the shaft 12 extends between the end sections 30 and 32, on which all of the parts 14, 18, 22, 24, 26 and 28 are positioned. Such intermediate portion of the shaft 12 includes threaded sections 40 and 42 extending from the end section 30 on which the nuts 22 and 18 are respectively positioned. A non-threaded section 44 of the intermediate shaft portion extends axially from the threaded section 42 to a somewhat radially larger threaded section 46 on which the outer lock nut 24 is positioned by the inner nut 26, threadedly positioned on both the shaft section 46 and a threaded section 48 extending toward the end section 32. All of the intermediate shaft sections 40, 42, 44 and 46 form a flat surface 50 radially inward on one (upper) side relative to the cross-sectionally circular shaft section 48. The shaft section 40 is also flattened on the other (lower) side thereof over which the end lock nut 22 is positioned. The diameter of the threaded shaft section 48 is also larger than the diameter of shaft section 44 to provide an added advantage in the event loosening of the nuts 24 and 26 occurs.

It will be apparent from the foregoing description that the shaft 12 is configured so as to receive the gear 14 over the flat surface 50 of a width sufficient to receive the tapered key 27 thereon as shown in FIG. 3. Such key 27 transmits torque between the shaft 12 and the gear 14, and prevents slippage therebetween because of its retention within the tapered wedge 28, so as to eliminate clearance. The locator nut 18 is positioned on the threaded section 42 of the shaft 12 for proper positioning of the gear 14, while the lock nut 22 prevents angular displacement of the locator nut 18 through which such desired location of the gear 12 is established and maintained.

During installation of the component 10, the lock nut 22 is tightened against the lock nut 18 after the desired positioning of the gear 14 is established with the wedge 28 and key 27 in full contact throughout. The wedge 28 is dimensioned to allow for its circumferential deformation when pressed inside the tapered slot formed in the gear 14 receiving the key 27, which is deformed inside such key slot by axial engagement with the outer nut 24. Accordingly, when so installed, movements between the gear 14 and shaft 12 under load are avoided.

Disassembly of the component 10 is facilitated by use of the flattened sections 40 and 42 of the shaft 12 as a gripping location thereon to unbolt and remove the nuts 22 and 18. The inner nut 26 may then be unbolted without disturbing the outer nut 24. The gear 14 may then be more readily disassembled by disengaging the wedge 28 therefrom for example.

Obviously, other modifications and variations of the present invention may be possible in light of the foregoing teachings. It is therefore to be understood that within the scope of the appended claims the invention may be practiced otherwise than as specifically described.

What is claimed is:

1. A structural drive component of a power transmitting system, comprising: an externally configured shaft; a rotational member axially positioned on the shaft at a desired location thereon; locator means threaded to the shaft in contact with the rotational member for establishing said desired location thereof; torque transmitting means positioned on the shaft within said rotational member for interconnection thereof, wherein said torque transmitting means includes, a flat surface positioned alone an intermediate portion of the externally configured shaft and a tapered key extending through a slot formed in the rotational member, the tapered key being positioned in contact with the flat surface, the torque transmitting means further including a wedge positioned on said intermediate portion of the shaft exposing the flat surface to the key; and holding means threaded to the shaft in axial engagement with the torque transmitting means for deformation thereof to maintain said interconnection between the shaft and the member without clearance.

2. The drive component as defined in claim 1, wherein said holding means comprises: an inner nut threaded to the shaft in axial engagement with the wedge; and an outer nut threaded to the inner nut in axial engagement with the key.

3. The drive component as defined in claim 2, wherein said rotational member is a peripherally toothed gear.

4. The drive component as defined in claim 1, wherein said holding means comprises: an inner nut threaded to the shaft in axial engagement with the torque transmitting means; and an outer nut threaded to the inner nut in axial engagement with the torque transmitting means.

5. The drive component as defined in claim 1, wherein said rotational member is a peripherally toothed gear.

* * * * *